United States Patent
Wu et al.

(10) Patent No.: US 12,406,097 B2
(45) Date of Patent: Sep. 2, 2025

(54) DATA PROCESSING METHOD AND DEVICE AND STORAGE MEDIUM

(71) Applicant: HUAWEI TECHNOLOGIES CO., LTD., GuangDong (CN)

(72) Inventors: Yongzheng Wu, Singapore (SG); Zhiguo Ge, Shenzhen (CN); Tao Huang, Singapore (SG); Chenyu Wang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 18/151,890

(22) Filed: Jan. 9, 2023

(65) Prior Publication Data
US 2023/0161916 A1 May 25, 2023

Related U.S. Application Data

(63) Continuation of application No. PCT/CN2020/101415, filed on Jul. 10, 2020.

(51) Int. Cl.
*G06F 21/64* (2013.01)
*G06F 12/02* (2006.01)

(52) U.S. Cl.
CPC ............ *G06F 21/64* (2013.01); *G06F 12/023* (2013.01); *G06F 2212/1052* (2013.01)

(58) Field of Classification Search
CPC . G06F 21/64; G06F 12/023; G06F 2212/1052
See application file for complete search history.

(56) References Cited

U.S. PATENT DOCUMENTS

| 9,798,900 B2 | 10/2017 | Oh et al. |
| 2019/0042795 A1* | 2/2019 | Bolotov .............. G06F 11/1048 |
| 2019/0260799 A1 | 8/2019 | Chen et al. |

(Continued)

FOREIGN PATENT DOCUMENTS

| CN | 102971689 A | 3/2013 | |
| WO | WO-2020128413 A1 * | 6/2020 | ......... G06F 12/1009 |

OTHER PUBLICATIONS

Shay Gueron, "Memory Encryption for General-Purpose Processors," IEEE Security and Privacy (vol. 14, Issue:6, Nov./Dec. 2016 ), Dec. 14, 2016; pp. 54-62 (9 total pages).

(Continued)

*Primary Examiner* — Esther B. Henderson
(74) *Attorney, Agent, or Firm* — Rimon PC

(57) ABSTRACT

A processor obtains a first child node in response to a read request for target data when the first child node is not verified in the processor. The first child node is a child node that is in an integrity tree and that is related to the target data. The integrity tree includes a plurality of root nodes and a plurality of child nodes. The plurality of root nodes are in a decompressed state and the plurality of child nodes are in a compressed state. The processor decompresses the first child node in the compressed state, and caches the decompressed first child node into the processor for integrity verification on the target data. The plurality of child nodes of the integrity tree are stored in a form of the compressed state in the memory, so that storage space of the memory can be saved, and the sizes of the child nodes can be reduced.

20 Claims, 7 Drawing Sheets

(56) References Cited

U.S. PATENT DOCUMENTS

| | | | |
|---|---|---|---|
| 2020/0004696 A1* | 1/2020 | Chhabra | ............... H04L 9/0897 |
| 2020/0175074 A1 | 6/2020 | Li et al. | |
| 2021/0109825 A1* | 4/2021 | Liao | ....................... H04L 9/085 |

OTHER PUBLICATIONS

Saileshwar et al., "Morphable Counters: Enabling Compact Integrity Trees For Low-Overhead Secure Memories," In 2018 51st Annual IEEE/ACM International Symposium on Micro architecture (MICRO), IEEE, Oct. 20-24, 2018; pp. 416-427 (12 total pages).
Intel, "Software Guard Extensions Tutorial Series: Part 1, Intel SGX Fundamentals," 2015, 7 total pages (including English translation).

* cited by examiner

DATA PROCESSING METHOD AND DEVICE AND STORAGE MEDIUM

CROSS-REFERENCE TO RELATED APPLICATIONS

This application is a continuation of International Application No. PCT/CN2020/101415, filed on Jul. 10, 2020, the disclosure of which is hereby incorporated by reference in its entirety.

TECHNICAL FIELD

This application generally relates to the field of computer security technologies, and in particular, to a data processing method and device and a storage medium.

BACKGROUND

Data integrity is one of the three elements of information security. Data integrity may be understood as ensuring that information or data is not subjected to tampering without authorization or that tampering can be quickly discovered during information or data transmission, storage, and processing.

To prevent data tampering, a concept of an integrity tree is proposed in an Intel software guard extensions (SGX) architecture. The integrity tree is used to protect an integrity of internal memory data and protect data in an internal memory from replay attacks. The integrity tree is stored in a main memory. When a processor needs to access the integrity tree, the integrity tree is loaded into a cache. For example, when the processor reads data from the internal memory, the processor reads ciphertext data from the internal memory, and decrypts the ciphertext data. To verify integrity of the read data, the processor reads the integrity tree from the internal memory and verifies integrity of the data by using the integrity tree.

Current data integrity verification processes have problems of high time overheads, slow verification, and excessive storage resources being occupied.

SUMMARY

Embodiments of this application provide a data processing method and device and a storage medium, to resolve problems of high time overheads, slow verification, and excessive storage resources being occupied in a current data integrity verification process.

According to a first aspect, an embodiment of this application provides a data processing method, applied to a data processing device. The data processing device includes a processor and a memory, and the processor includes a cache and a register. An integrity tree for data integrity verification includes a plurality of root nodes and a plurality of child nodes, the plurality of root nodes are stored in a form of a decompressed state in the register of the processor, and the plurality of child nodes are stored in a form of a compressed state in the memory. In addition, the cache of the processor caches child nodes that are previously read from the memory, and the read child nodes are stored in the form of the decompressed state in the cache of the processor.

Based on the data processing device, a data processing process in some embodiments includes: obtaining a first child node in the compressed state from the memory in response to a read request for target data when the first child node is not detected in the processor, for example, when the first child node is not detected in the cache of the processor, where the first child node is a child node that is in the integrity tree and that is related to the target data: and decompressing the first child node in the compressed state, and caching the decompressed first child node into the processor, where the first child node is used for integrity verification on the target data.

In some embodiments, because the processor is trusted, and data in the processor is not easily tampered with, the root nodes of the integrity tree and the child nodes cached in the processor are stored in the form of the decompressed state in the processor, which makes it convenient for the processor to perform data integrity verification by using the integrity tree nodes in the decompressed state. The child nodes of the integrity tree are stored in the form of the compressed state in the memory, so that storage space of the memory can be saved, storage space overheads of the memory can be reduced, and sizes of the child nodes can be effectively reduced. In a data reading process, the processor obtains a first child node in a compressed state from the memory in response to a read request for target data when the first child node is not verified in the processor, decompresses the first child node in the compressed state, and caches the decompressed first child node into the processor, so that the processor performs integrity verification on the target data by using the first child node. Because a data amount of the first child node in the compressed state is small, the processor can quickly read the first child node in the compressed state from the memory for integrity verification on the target data, thereby reducing time overheads of data integrity verification, and improving an integrity verification speed.

In some embodiments, because storage space of the processor is limited, when a quantity of child nodes cached in the processor reaches a preset value, a cached child node may need to be removed. A process of removing a cached child node includes: obtaining a to-be-removed second child node in the processor when it is detected that a quantity of child nodes in the processor reaches a preset value; and compressing the to-be-removed second child node when it is detected that the to-be-removed second child node is changed, and replacing a second child node in the memory with the compressed second child node.

In an implementation, the compressing the to-be-removed second child node includes the following two cases:

Case 1: The to-be-removed second child node is pre-compressed, and when a size of the pre-compressed second child node is less than a size of a minimum storage unit of the memory, the pre-compressed second child node is used as a final compression result and stored in the memory.

Case 2: The to-be-removed second child node is pre-compressed, and when the size of the pre-compressed second child node is greater than the size of the minimum storage unit of the memory, a first value is added to a value of an overflow counter of the second child node, a value of each sub-counter of the second child node is set to a second value, and the reset second child node is re-compressed. The first value is a positive number greater than 0, and the second value is a positive number. For example, the first value is 1, and the second value is 0.

Because a message authentication code (MAC) of the second child node is related to the values of the counters of the second child node, in Case 2, when the values of the counters of the to-be-removed second child node are changed, the MAC of the second child node is also changed. Therefore, the MAC of the second child node needs to be re-determined based on reset values of the counters in the second child node, and the re-determined MAC is written into the memory.

In some embodiments, a branching factor of the integrity tree in some embodiments is a preset parameter, and the preset parameter is a positive integer greater than 8 in exponential multiples of 2. A current common branching factor of the integrity tree is 8, while the branching factor of the integrity tree in some embodiments is greater than 8, for example, 16 or 32, so that a quantity of layers of the integrity tree can be reduced, and a quantity of times of accessing the integrity tree by the processor can be reduced, thereby improving a data integrity verification speed. For example, the integrity tree maintains 16 GB storage space. The current branching factor of the integrity tree is 8, and a quantity of layers of an integrity tree generated by the branching factor is $\log_8(16,000,000,000)=12$ layers. During integrity verification, the memory needs to be accessed 12 times, which results in high time overheads of integrity verification and a slow verification speed. In some embodiments, the branching factor of the integrity tree is greater than 8, for example, 32, and when the integrity tree whose branching factor is 32 maintains 16 GB storage space, a quantity of layers of the integrity tree is $\log_{32}(16,000,000,000)=7$. During integrity verification, the memory needs to be accessed only seven times, which effectively reduces a quantity of times of accessing the integrity tree by the processor, thereby reducing time overheads of integrity verification, and improving an integrity verification speed.

In some embodiments, to further improve the data integrity verification speed, when the first child node in the compressed state is decompressed, at least two threads may be used to perform parallel decompression on the first child node; and/or when the second child node is compressed, at least two threads may be used to perform parallel compression on the second child node.

According to a second aspect, an embodiment of this application provides a data processing device, including a memory and a processor. The memory is configured to store data. The processor is configured to perform read/write access on the data stored in the memory.

The processor is configured to: obtain a first child node in a compressed state from the memory in response to a read request for target data when the first child node is not detected in the processor, where the first child node is a child node that is in an integrity tree and that is related to the target data, the integrity tree includes a plurality of root nodes and a plurality of child nodes, the plurality of child nodes are stored in the compressed state in the memory, and the plurality of root nodes are stored in a decompressed state in the processor; and decompress the first child node in the compressed state, and cache the decompressed first child node into the processor, where the first child node is used for integrity verification on the target data.

In some embodiments, because the processor is trusted, and data in the processor is not easily tampered with, the root nodes of the integrity tree and child nodes cached in the processor are stored in a form of the decompressed state in the processor, which makes it convenient for the processor to perform data integrity verification by using the integrity tree nodes in the decompressed state. The child nodes of the integrity tree are stored in the compressed state in the memory, so that storage space of the memory can be saved, storage space overheads of the memory can be reduced, and sizes of the child nodes can be effectively reduced. In a data reading process, the processor obtains a first child node in a compressed state from the memory in response to a read request for target data when the first child node is not verified in the processor, decompresses the first child node in the compressed state, and caches the decompressed first child node into the processor, so that the processor performs integrity verification on the target data by using the first child node. Because a data amount of the first child node in the compressed state is small, the processor can quickly read the first child node in the compressed state from the memory for integrity verification on the target data, thereby reducing time overheads of data integrity verification, and improving an integrity verification speed.

In some embodiments, the processor is configured to: obtain a to-be-removed second child node in the processor when it is detected that a quantity of child nodes in the processor reaches a preset value; and compress the to-be-removed second child node when it is detected that the to-be-removed second child node is changed, and replace a second child node in the memory with the compressed second child node.

In some embodiments, the processor is configured to: pre-compress the to-be-removed second child node, and when a size of the pre-compressed second child node is greater than a size of a minimum storage unit of the memory, add a first value to a value of an overflow counter of the second child node, set a value of each sub-counter of the second child node to a second value, and re-compress the reset second child node. The first value is a positive number greater than 0, and the second value is a positive number. For example, the first value is 1, and/or the second value is 0.

In some embodiments, the processor is configured to: when the value of each sub-counter of the second child node is set to the second value, re-determine a message authentication code MAC of the second child node: and write the re-determined MAC into the memory.

In some embodiments, a branching factor of the integrity tree is a preset parameter, and the preset parameter is a positive integer greater than 8 in exponential multiples of 2. For example, the preset parameter is 16 or 32.

In some embodiments, the processor is configured to: perform parallel decompression on the first child node by using at least two threads; and/or perform parallel compression on the to-be-removed second child node by using at least two threads.

For beneficial effects of the data processing device provided in the second aspect and the possible implementations of the second aspect, refer to beneficial effects brought by the first aspect and the possible implementations of the first aspect. Details are not described herein again.

According to a third aspect, an embodiment of this application provides a computer storage medium. The storage medium includes computer instructions, and when the instructions are executed by a computer, the computer is enabled to implement the data processing method according to the first aspect.

According to a fourth aspect, an embodiment of this application provides a computer program product. The program product includes a computer program, the computer program is stored in a readable storage medium, at least one processor of a communications device may read the computer program from the readable storage medium, and the at least one processor executes the computer program, to enable the communications device to perform the data processing method according to the first aspect.

According to the data processing method and device and the storage medium that are provided in embodiments of this application, a processor obtains a first child node in a compressed state from a memory in response to a read request for target data when the first child node is not verified in the processor. The first child node is a child node that is in an integrity tree and that is related to the target data, the integrity tree includes a plurality of root nodes and a plurality of child nodes, the plurality of child nodes are stored in the compressed state in the memory, and the plurality of root nodes are stored in a decompressed state in the processor. Then, the processor decompresses the first child node in the compressed state, and caches the decompressed first child node into the processor for integrity verification on the target data. In embodiments of this application, the root nodes of the integrity tree are stored in a form of the decompressed state in the processor, which makes it convenient for the processor to perform data integrity verification by using the root nodes in the decompressed state. The child nodes of the integrity tree are stored in a form of the compressed state in the memory, so that storage space of the memory can be saved, storage space overheads of the memory can be reduced, and sizes of the child nodes can be effectively reduced, so that the processor can quickly read the child nodes in the compressed state from the memory for data integrity verification, thereby reducing time overheads of data integrity verification, and improving an integrity verification speed.

DESCRIPTION OF EMBODIMENTS

The following describes technical solutions in embodiments of this application with reference to the accompanying drawings in embodiments of this application.

It should be understood that in embodiments of this application, "B corresponding to A" indicates that B is associated with A. In an implementation, B may be determined based on A. However, it should be understood that determining B based on A does not mean that B is determined based on only A. B may alternatively be determined based on A and/or other information. The term "a plurality of" as used herein means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" as used herein indicates an "or" relationship between associated objects. In a formula, the character "/" indicates a "divide" relationship between associated objects.

The terms such as words "first" and "second" in the specification, claims, and drawings of this application distinguish between identical items or similar items having essentially same functions and effects. A person skilled in the art may understand that the terms such as "first" and "second" do not limit a quantity or an execution sequence, and the terms such as "first" and "second" do not indicate a definite difference.

For ease of understanding embodiments of this application, related concepts in embodiments of this application are first briefly described as follows:

Data integrity is one of three elements of information security, which means ensuring that information or data is not subjected to tampering without authorization or tampering can be found quickly during information or data transmission, storage, and processing.

A replay attack means that an attacker records data and a message authentication code (MAC) value at a time point T1, and then replays, at a time point T2, the data and the MAC value that are recorded at the time point T1, to attempt to modify data at the time point T2 into the data at the time point T1.

An integrity tree is a data structure for protecting integrity of a memory, which is a tree structure and includes a plurality of integrity tree nodes. The integrity tree is characterized in that integrity of local data can be quickly verified, and is widely applied to scenarios including Bitcoin, Android phone system partitions, and the like.

A branching factor is a quantity of child nodes included by each node in an integrity tree. For example, if each node in an integrity tree includes eight child nodes, a branching factor of the integrity tree is 8.

The integrity tree has various variations. The following describes a common integrity tree, as shown in FIG. 1.

Figure 1:
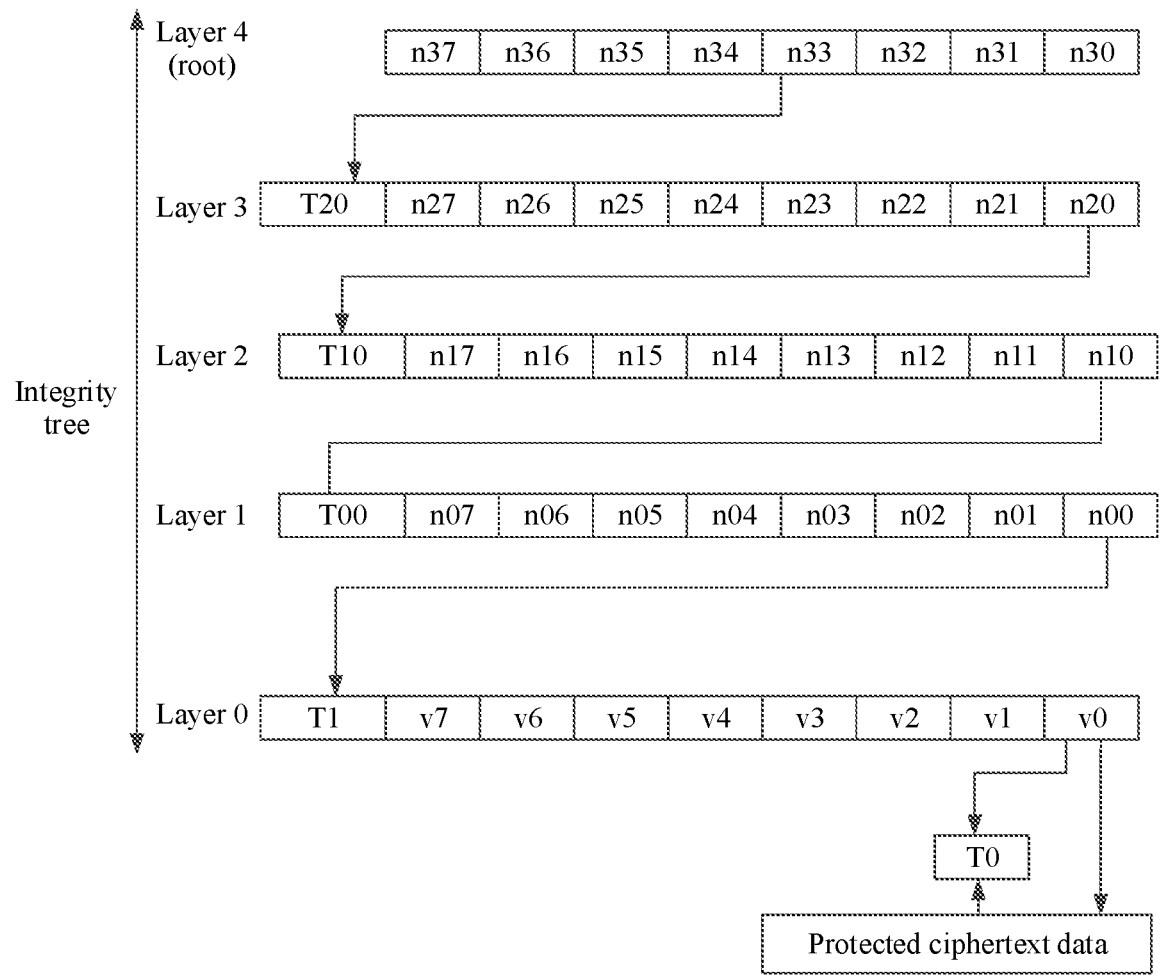
FIG. 1 is a schematic diagram of a structure of an integrity tree according to an embodiment of this application.

FIG. 1 is a schematic diagram of a structure of an integrity tree according to an embodiment of this application. As shown in FIG. 1, the integrity tree includes five layers, where layers are connected by specific dependencies, and a branching factor is 8, that is, each node includes eight child nodes. As shown in FIG. 1, n37, n36, . . . , and n30 are root nodes. n20, n21, . . . , and n27 are eight child nodes of the root node n33, and are located at a layer 3. n10, n11, . . . , and n17 are child nodes of the node n20, and are located at a layer 2. n00, n01, . . . , and n07 are child nodes of the node n10, and are located at a layer 1. v0, v1, . . . , and v7 are leaf nodes of the child node n00, and are located at a layer 0. A storage area of a memory is divided into a plurality of data blocks, and one leaf node corresponds to one data block, and is used to maintain integrity of data in the data block.

Figure 2:
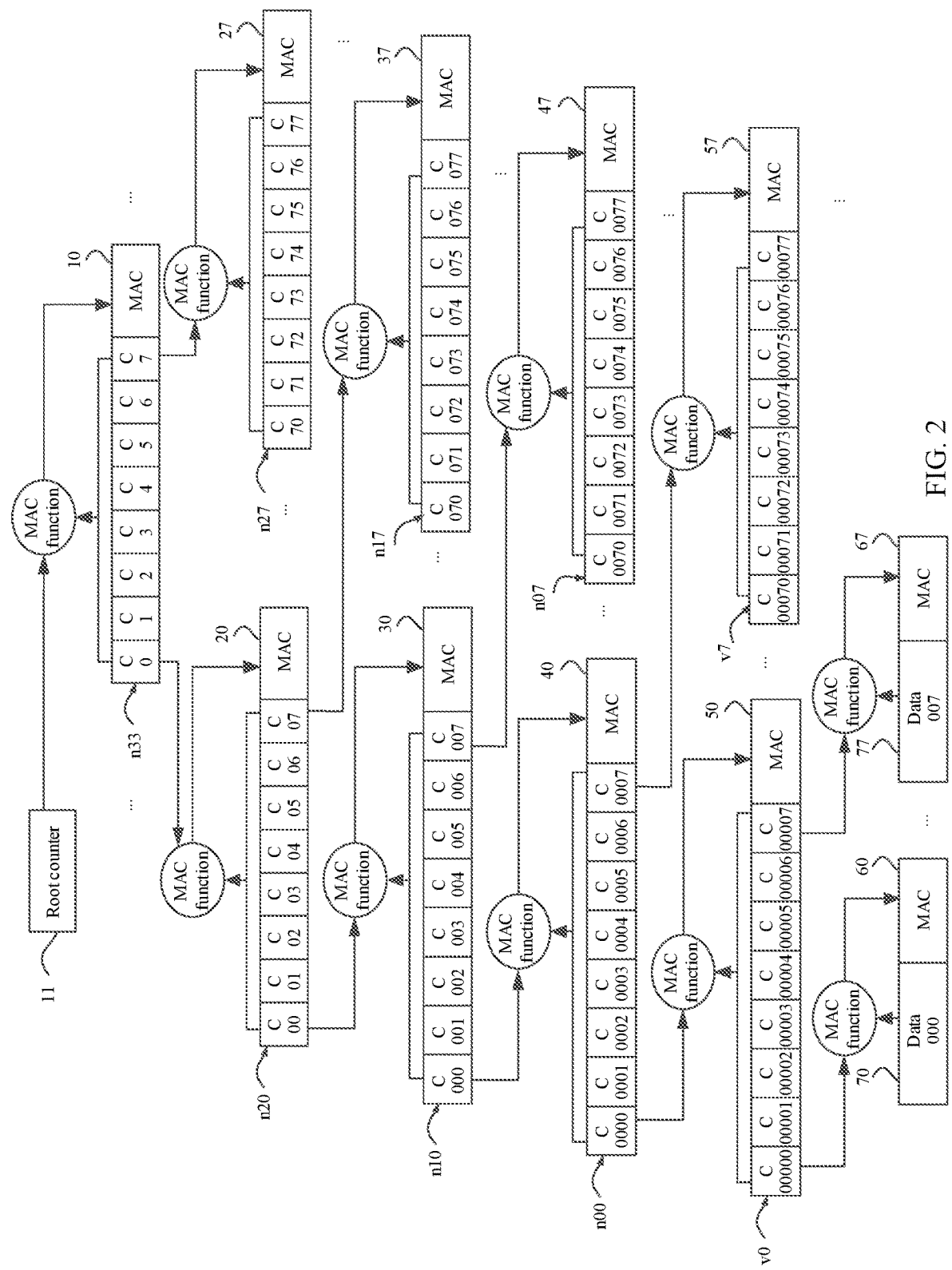
FIG. 2 is a schematic diagram of a data structure of a counter integrity tree according to an embodiment of this application.

It is assumed that each node in FIG. 1 includes eight counters and one tag (Tag, T for short). In this case, a data structure of the integrity tree shown in FIG. 1 is shown in FIG. 2. FIG. 2 is a schematic diagram of a data structure of a counter integrity free according to an embodiment of this application. As shown in FIG. 2, it is assumed that the tag of each node is a MAC. The root node n33 is used as an example. A root counter corresponding to the root node n33 is a counter 11, the root node n33 includes eight counters and a MAC 10, the eight counters are respectively C0 to C7, and the MAC 10 is calculated by using a MAC function based on the root counter 11 and the eight counters C0 to C7 of the root node n33. The eight counters of the root node n33 respectively correspond to the eight child nodes n20 to n27 of the root node u33 one by one. For example, the node n20 corresponds to the counter C0 of the root node n33, the node n21 corresponds to the counter C1 of the root node n33, and by analogy, the node n27 corresponds to the counter C7 of the root node n33. Each of the child nodes n20 to n27 includes eight counters and one MAC. For example, the child node n20 includes eight counters C00 to C07 and a MAC 20. The MAC 20 is calculated by using the MAC function based on the counter C0 of the root node n33 and the eight counters C00 to C07 of the child node n20. For example, a MAC 27 of the child node n27 is calculated by using the MAC function based on the counter C7 of the root node n33 and eight counters C70 to C77 of the child node n27. By analogy, a MAC 30 of the child node n10 is calculated by using the MAC function based on the counter C00 of the node n20 and eight counters C000 to C007 of the node n10, a MAC 37 of the child node n17 is calculated by using the MAC function based on the counter C07 of the node n20 and eight counters C070 to C077 of the node n17, a MAC 40 of the child node n00 is calculated by using the MAC function based on the counter C000 of the node n10 and eight counters 00000 to C0007 of the node n00, and a MAC 47 of the child node n07 is calculated by using the MAC function based on the counter C007 of the node n10 and eight counters C0070 to C0077 of the node n07.

By analogy, for the eight leaf nodes v0 to v7 of the child node n00, each leaf node includes eight counters and one MAC. The leaf node v0 is used as an example. The leaf node v0 includes eight counters C00000 to C00007 and a MAC 50. The MAC 50 is calculated by using the MAC function based on the counter C0000 of the child node n00 and the eight counters C00000 to C00007 of the leaf node v0. The eight counters of the leaf node v0 respectively correspond to eight data blocks in the memory, and each data block corresponds to one MAC. For example, a MAC 60 of a data block 70 is calculated by using the MAC function based on the counter C00000 and data 000 in the data block 70, and a MAC 67 of a data block 77 is calculated by using the MAC function based on the counter C00007 and data 007 in the data block 77.

It can be learned from FIG. 2 that a MAC for verifying integrity of data in a data block is maintained by a leaf node corresponding to the data block, a MAC for verifying integrity of the leaf node is maintained by a parent node of the leaf node, integrity of the parent node may be maintained by using another parent node in the tree, and the same goes on until a root node.

In a data reading process, as shown in FIG. 2, for example, the data 000 in the data block 70 is read. To verify integrity of the data 000 in the data block 70, verification is performed on the MAC 60 of the data block 70. The counter C00000 in the leaf node v0 is read, a MAC 1 is calculated by using the MAC function based on the counter C00000 and the data 000, and matching is performed between the calculated MAC 1 and the MAC 60 stored in the data block 70. If the stored MAC 60 does not match the calculated MAC 1, it indicates that the data 000 is tampered with. If the stored MAC 60 matches the calculated MAC 1, verification is further performed on integrity of the leaf node v0. A parent node (that is, the node n00) of the leaf node v0 is read, a calculated MAC of the leaf node v0 is calculated by using the MAC function based on a counter (that is, the counter C0000) corresponding to the leaf node v0 in the node n00 and the eight counters of the leaf node v0, and matching is performed between the calculated MAC of the leaf node v0 and the stored MAC of the leaf node v0. If the stored MAC of the leaf node v0 does not match the calculated MAC of the leaf node v0, it indicates that the leaf node v0 is tampered with, and integrity verification on the data 000 fails. If the storage MAC of the leaf node v0 matches the calculated MAC of the leaf node v0, verification is further performed on integrity of the parent node (that is, the node n00) of the leaf node v0. The same goes on until verification on the root node n33. If it is verified that the stored MAC of the root node n33 matches a calculated MAC of the root node n33, it indicates that the data 000 is not tampered with.

In a data writing process, as shown in FIG. 2, each time data is written into a data block, a corresponding counter in the integrity tree is incremented or updated. For example, when data is written into the data block 70, and the data in the data block 70 is updated, the counter C00000 in the leaf node v0 corresponding to the data block 70 is incremented, for example, +1. The increment of the counter C00000 in the leaf node v0 triggers the MAC of the leaf node v0 to be recalculated, the recalculation of the MAC of the leaf node v0 triggers the counter (that is, the counter C0000) in the parent node n00 of the leaf node v0 to be incremented, and the same goes on until the MAC of the root node is updated.

It should be noted that, as shown in FIG. 2, a MAC of a data block and corresponding data are stored in a same cache line. Optionally, the MAC of the data block and the corresponding data may be stored separately.

Figure 3:
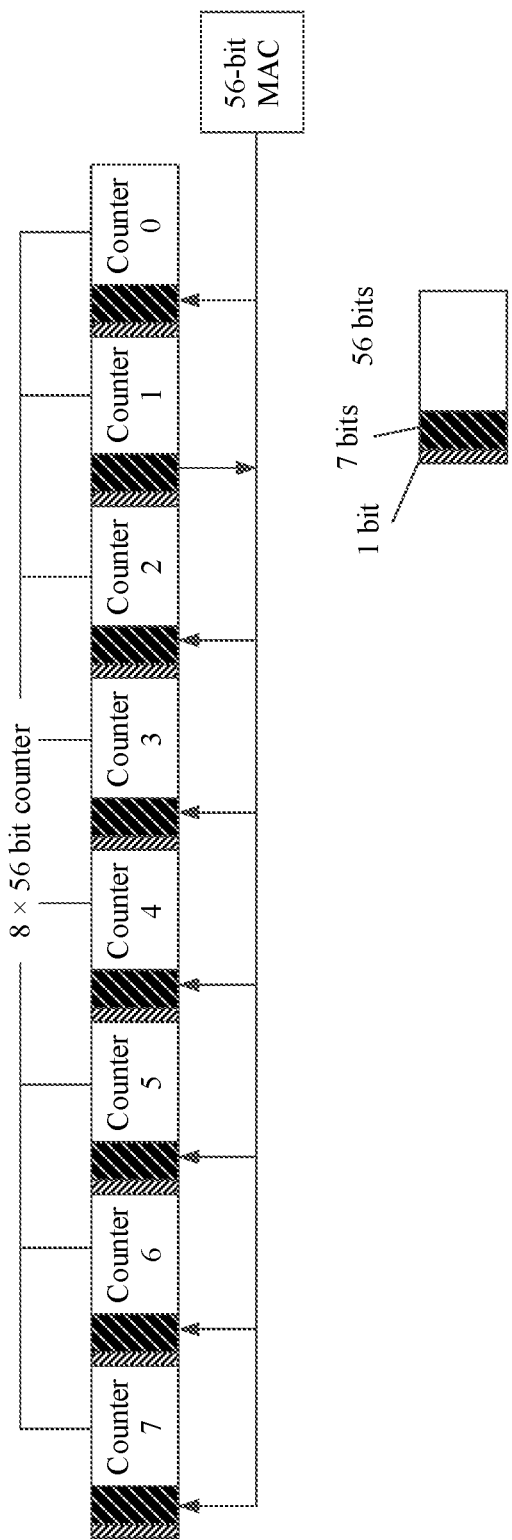
FIG. 3 is a schematic diagram of a data structure of a node in an integrity tree.

For each node in the integrity tree, a MAC of the node and a plurality of counters of the node are cached in a same cache line to ensure integrity of the node. As shown in FIG. 2, a MAC of a node is stored as a whole. Optionally, the MAC of the node may be stored in parts. For example, FIG. 3 is a schematic diagram of a data structure of a node in an integrity tree. As shown in FIG. 3, the MAC of the node may be divided into a plurality of parts to be stored separately. For example, the MAC of the node is divided into eight equal parts, respectively stored together with eight counters of the node in a one-to-one correspondence. Each counter occupies 56 bits. It should be noted that, FIG. 3 shows a MAC with a size of 56 bits, the 56-bit MAC is divided into eight equal parts, each part is 7 bits and stored in storage space of 8 bits. Optionally, the size of the MAC includes but is not limited to 56 bits. During division, the MAC may not be divided into equal parts for storage.

Optionally, the MAC function in FIG. 2 may be a unidirectional cryptographic function such as AES-GCM or SHA-256.

Figure 4:
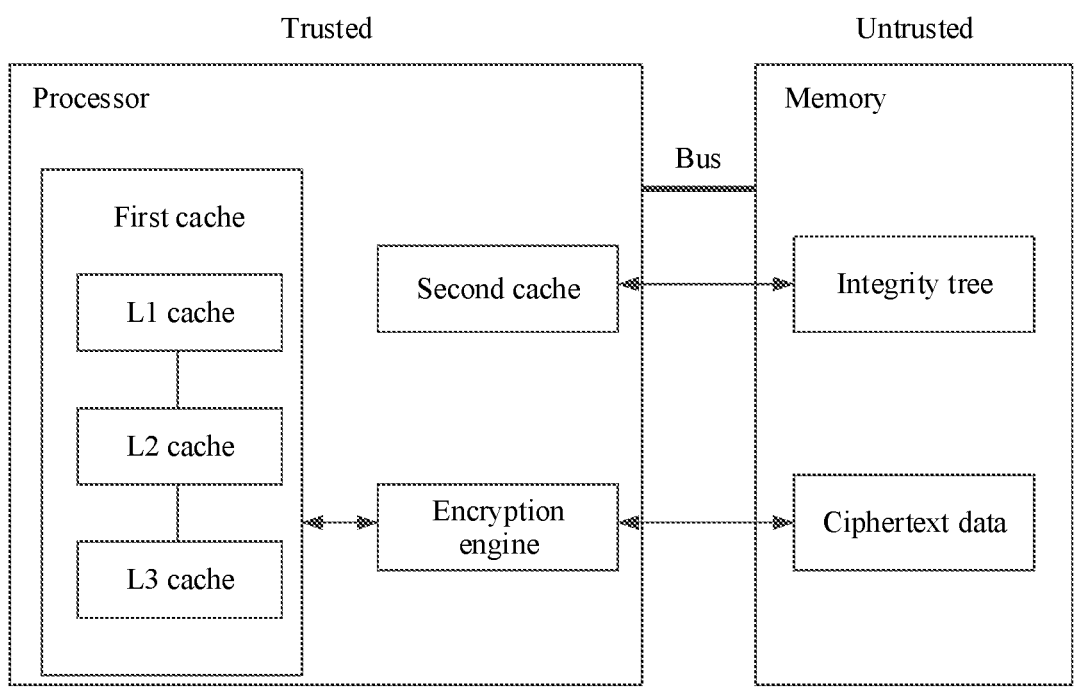
FIG. 4 is a schematic diagram of an application scenario according to an embodiment of this application.

FIG. 4 is a schematic diagram of an application scenario according to an embodiment of this application. As shown in FIG. 4, the application scenario includes a processor and a memory. The processor is trusted, and the memory is untrusted, that is, data in the processor cannot be attacked or tampered with by an attacker, while data in the memory may be arbitrarily attacked or tampered with by an attacker. Therefore, to prevent an attacker from reading the data in the memory, the processor may need to encrypt the data in the memory, so that the attacker cannot read the data in the memory. In addition, to prevent an attacker from performing a replay attack on the data in the memory to tamper with the data in the memory, each time the processor reads data from the memory, the processor needs to perform integrity verification on the data.

As shown in FIG. 4, the processor includes a first cache, a memory encryption engine, and a second cache. The first cache may be a multi-level cache, for example, including an L1 cache, an L2 cache, and an L3 cache. The first cache is configured to cache data, for example, configured to cache data read from the memory. The memory encryption engine is configured to encrypt data to be written into the memory, and decrypt the data read from the memory. The second cache is configured to cache an integrity tree node that is read from the memory last time. The memory includes ciphertext data and an integrity tree.

In a data reading process, the processor first queries, in the first cache, whether to-be-read target data is cached, and directly reads the target data from the first cache if the first cache caches the target data. If the target data is not found in the first cache, the target data is read from the memory. Ciphertext data of the target data is read from the memory, and is stored in the first cache after decrypted.

To verify integrity of the target data, the processor queries, in the second cache, whether an integrity tree node corresponding to the target data exists. If the integrity tree node exists, the processor verifies integrity of the target data by using the integrity tree node. If the processor does not find, in the second cache, the integrity tree node corresponding to the target data, the processor reads, from the memory, the integrity tree node corresponding to the target data, for example, a node 1, and calculates a MAC of the target data by using the node 1. If the calculated MAC matches a stored MAC of the target data, verification is further performed on integrity of the node 1, and the same goes on until verification on a corresponding root node.

It can be learned from above that, because there are a large quantity of layers of the integrity tree, when data integrity verification is performed, integrity tree nodes need to be read from the memory a plurality of times. For example, as shown in FIG. 1 and FIG. 2, when verification is performed on integrity of target data, integrity of a leaf node corresponding to the target data needs to be verified. When verification is performed on integrity of the leaf node, integrity of a node that is at the layer 1 and that corresponds to the leaf node needs to be verified. When verification is performed on integrity of the node at the layer 1, integrity of a corresponding node at the layer 2 needs to be verified, and so on. A quantity of times of verification that needs to be performed is equal to a quantity of layers of the integrity tree. The memory needs to be accessed once for each verification, which causes problems of high time overheads of memory access and a slow verification speed. In addition, the integrity tree is stored in a form of a decompressed state in the memory, which occupies excessive storage space, resulting in high storage space overheads.

To resolve the foregoing technical problems, in embodiments of this application, an integrity tree is stored in a form of a compressed state in a memory, so that storage space of the memory can be effectively saved, and storage space overheads of the memory can be reduced. During integrity verification, a processor reads the integrity tree in the compressed state from the memory. Because a data amount of the integrity tree in the compressed state is small, a speed at which the processor reads the integrity tree from the memory is improved, thereby reducing time overheads of data integrity verification, and improving an integrity verification speed.

The following describes in detail the technical solutions of embodiments of this application by using some embodiments. The following several embodiments may be combined with each other, and a same or similar concept or process may not be described repeatedly in some embodiments.

First, a system architecture in an embodiment of this application is described in detail with reference to FIG. 5.

Figure 5:
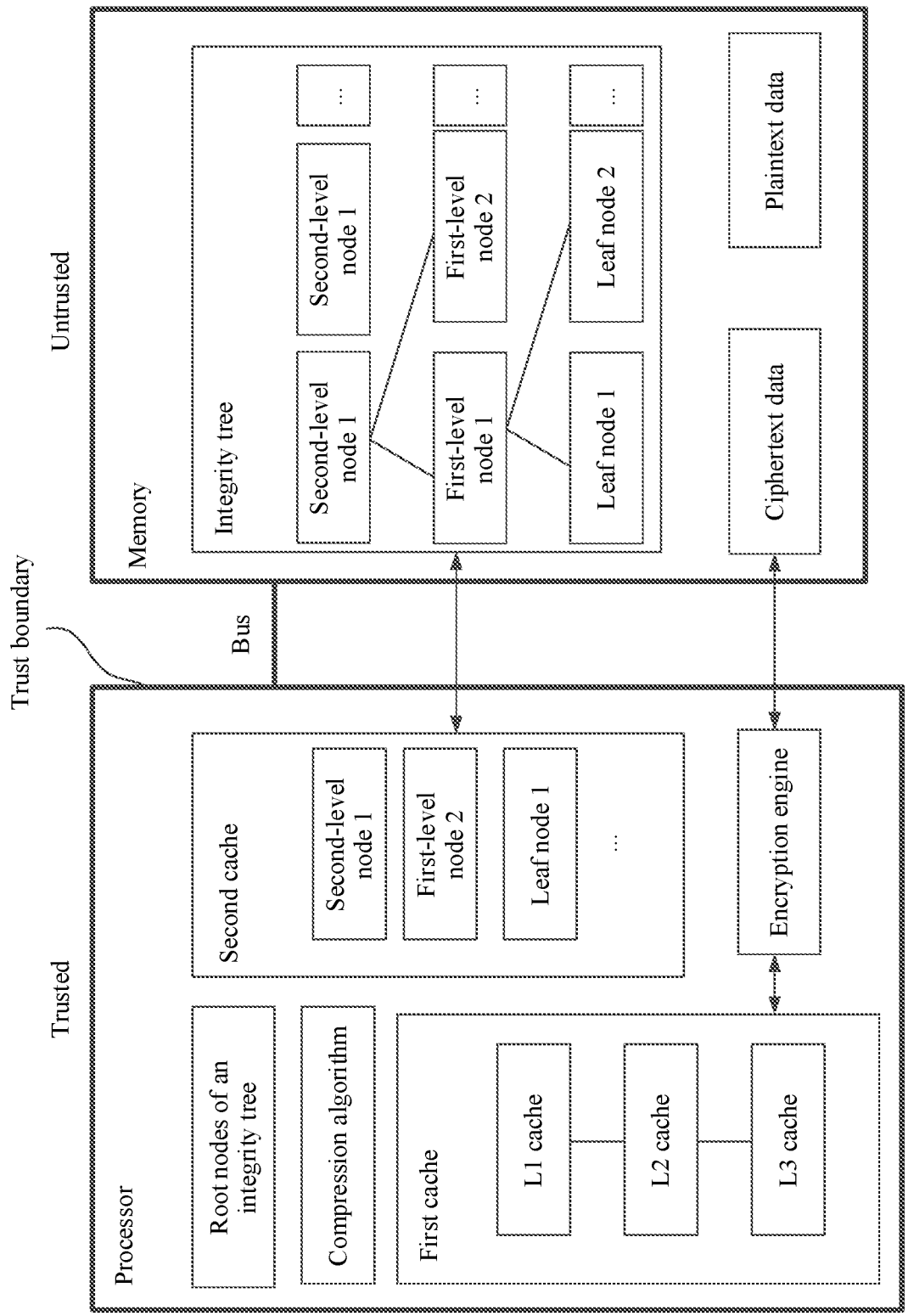
FIG. 5 is a schematic diagram of a system architecture according to an embodiment of this application.

FIG. 5 is a schematic diagram of a system architecture according to an embodiment of this application. As shown in FIG. 5, the system architecture includes a processor and a memory. The processor is trusted, and the memory is untrusted. That is, data in the processor is difficult to be tampered with by an attacker. Therefore, an edge of the processor may be used as a trust boundary. Any data that crosses the trust boundary may be tampered with. For example, data in the memory or data on a physical channel between the memory and the processor may be intercepted or tampered with. The processor is in communications connection to the memory by using a bus, for example, in communications connection by using a Bus.

The processor stores a root node of an integrity tree. Optionally, the processor may include one or more registers, and the root node of the integrity tree may be stored in any one of the one or more registers. The root node of the integrity tree is stored in a form of a decompressed state in the processor, so that the processor can quickly read the root node for integrity verification. For example, the root nodes n30 to n37 of the integrity tree shown in FIG. 1 are kept stored in the form of the decompressed state in the processor, and are not lost when powered off. The root node may be used to perform integrity verification on a child node of the root node. For example, the root node n33 is used to perform integrity verification on the child nodes n20 to n27 of the root node. Integrity verification on the child node n20 is used as an example. The processor reads the counters and the MAC of the node n20 from the memory. The node n20 corresponds to a counter in the node n33, for example, a counter 1. In this way, a MAC of the node n20 may be calculated by using a MAC function based on the counter 1 and the counters of the node n20, and matching is performed between the calculated MAC and the MAC read from the memory. If they match, it is determined that integrity verification on the node n20 succeeds. If they do not match, it indicates that integrity verification on the node n20 fails.

Because a quantity of root nodes of the integrity tree is relatively small, in some embodiments, the root node of the integrity tree is stored in the form of the decompressed state in the processor, so that the processor can quickly read the root node for data integrity verification. In addition, because the processor is trusted, storing the root node into the processor can prevent an attacker from reading or tampering with the root node, thereby ensuring reliability and accuracy of data integrity verification.

The processor further includes a first cache. The first cache may include a plurality of levels of caches, for example, including an L1 cache, an L2 cache, and an L3 cache. The first cache is configured to cache data, for example, configured to cache data read from the memory. The data in the first cache is data on which integrity verification succeeds. In this way, in a process of reading target data, the processor first queries the first cache for the target data. The processor queries the L1 cache for the target data, queries the L2 cache for the target data if the target data is not found in the L1 cache, and queries the L3 cache for the target data if the target data is not found in the L2 cache. After finding the target data in the first cache, the processor directly returns the found target data. When the processor does not find the target data in the first cache, the processor reads the target data from the memory, and performs integrity verification on the target data.

The processor further includes a second cache. The second cache is configured to cache a child node, read from the memory, of the integrity tree. The processor reads a child node, in a compressed state, of the integrity tree from the memory, decompresses the child node in the compressed state, and then caches the child node into the second cache for data integrity verification. That is, the second cache caches one or more child nodes of the integrity tree that are read during last integrity verification. Therefore, during current integrity verification, to improve an integrity verification speed, the processor first queries the second cache for a required child node, for example, a node 1. If the node 1 is found in the second cache, the node 1 is directly used to perform integrity verification without reading from the memory, thereby improving the integrity verification speed. In addition, because the processor is trusted, and an integrity tree node stored in the second cache is secure and is not tampered with by an attacker, integrity verification does not need to be further performed on the node cached in the second cache, thereby further improving the integrity verification speed. As shown in FIG. 1 and FIG. 2, for example, the second cache caches the leaf node v0, the node n16, and the node n22. The processor reads the data 000 in the data block 70 and the MAC 60 corresponding to the data 000 from the memory, and then performs integrity verification on the data 000. The processor determines, based on a correspondence between a data block and a leaf node, that the data block 70 corresponds to the leaf node v00. Then, the processor queries, in the second cache, whether the leaf node v00 exists. If the leaf node v00 is found in the second cache, the processor calculates, by using the MAC function based on the counters C00000 to C00007 of the leaf node v00 and the read data 000, a MAC corresponding to the data 000, denoted as a MAC 6. The processor performs matching between the calculated MAC 6 and the MAC 60 read from the memory. If the MAC 6 matches the MAC 60, it indicates that the data 000 is not tampered with, and integrity verification succeeds, and integrity verification does not need to be further performed on the leaf node v00. If the processor does not find the leaf node v00 in the second cache, the processor reads the leaf node v00 from the memory. According to the foregoing method, it is determined whether a calculated MAC 6 matches the MAC 60 read from the memory, and if they match, a parent node of the leaf node v00 is read from the memory to verify integrity of the leaf node v00, and the same goes on until a root node.

The processor further includes a memory encryption engine (MEE). The MEE is configured to encrypt a plaintext based on a counter, and further configured to decrypt a ciphertext read from the memory. This can prevent a malicious observer from reading data in the memory. An encryption key for encryption and decryption may be stored in the processor, for example, stored in a register in the processor. An encryption or decryption method used by the memory encryption engine is not limited in this embodiment of this application.

The processor further includes a compression algorithm. The processor compresses an integrity tree node by using the compression algorithm, and stores a compressed integrity tree node into the memory. Correspondingly, after reading an integrity tree node in the compressed state from the memory, the processor decompresses the integrity tree node in the compressed state by using the compression algorithm, and caches the decompressed integrity tree node into the second cache.

The memory includes ciphertext data. The ciphertext data is data encrypted by the memory encryption engine. For example, the processor controls the memory encryption engine to encrypt plaintext data to obtain ciphertext data, and stores the ciphertext data into the memory. The ciphertext data cannot be decrypted after read by an attacker, thereby preventing a malicious observer from reading data in the memory.

The memory further includes plaintext data. The plaintext data is data unencrypted, and may be arbitrarily read by an attacker.

The memory further includes all nodes except the root node in the integrity tree. For ease of understanding, the nodes except the root node in the integrity tree are collectively referred to as child nodes. In the memory, the child nodes in the integrity tree are stored in a form of the compressed state. In this way, a size of the integrity tree can be reduced, to save storage space of the memory. In addition, the processor can quickly read the child nodes in the compressed state for integrity verification, thereby reducing time overheads of integrity verification, and improving an integrity verification speed.

The processor in some embodiments may be one processor element, or may be a general term of a plurality of processor elements. For example, the processor may be a central processing unit (CPU), or an application specific integrated circuit (ASIC), or may be configured as one or more integrated circuits implementing some embodiments, for example, one or more microprocessors (digital signal processor (DSP)), or one or more field programmable gate array (FPGA).

The memory in some embodiments may be an internal memory, or any usable medium that can be accessed by a computer, or a data storage device such as a server or a data center that integrates one or more usable mediums. The usable medium may be a magnetic medium (for example, a floppy disk, a hard disk, or a magnetic tape), an optical medium (for example, a DVD), a semiconductor medium (for example, a solid state disk (SSD)), or the like.

Based on the system structure shown in FIG. 5, a data processing method provided in embodiments of this application is described in detail with reference to FIG. 6.

Figure 6:
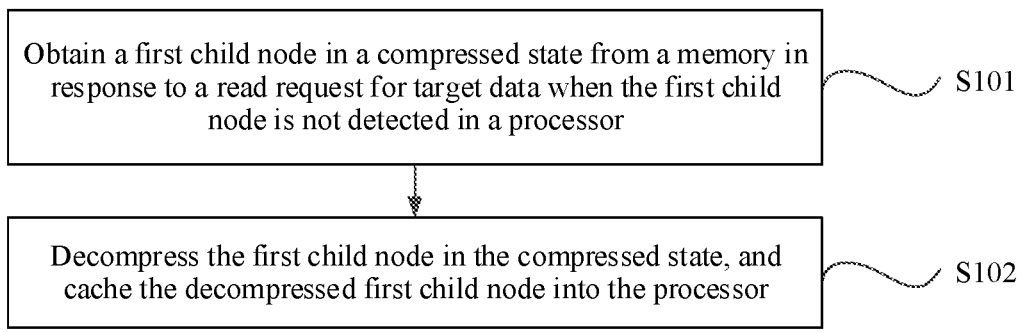
FIG. 6 is a schematic flowchart of a data processing method according to an embodiment of this application.

FIG. 6 is a schematic flowchart of a data processing method according to an embodiment of this application. As shown in FIG. 6, the method in some embodiments includes the following steps.

S101. Obtain a first child node in a compressed state from the memory in response to a read request for target data when the first child node is not detected in the processor.

The first child node is a child node that is in an integrity tree and that is related to the target data. Optionally, the first child node may be a leaf node corresponding to the target data. For example, as shown in FIG. 2, it is assumed that the target data is the data 000. The data 000 is stored in the data block 70. The data block 70 corresponds to the leaf node v0 in the integrity tree. Therefore, the first child node corresponding to the data 000 may be the leaf node v0. Optionally, the first child node may alternatively be a parent node of the leaf node corresponding to the target data. Still referring to FIG. 2, it is assumed that the target data is the data 000. A leaf node corresponding to the data 000 is the node v0, and a parent node corresponding to the leaf node v0 is the node n00. Therefore, the first child node corresponding to the data 000 may alternatively be the node n00. Optionally, the first child node corresponding to the target data may alternatively be a parent node of the parent node of the leaf node corresponding to the target data. Still referring to FIG. 2, it is assumed that the target data is the data 000. The parent node of the leaf node corresponding to the data 000 is the node n00, and a parent node corresponding to the node n00 is n10. Therefore, the first child node corresponding to the target data may alternatively be the node n10, and so on. That is, the first child node in some embodiments is any child node that is in the integrity tree and that is related to an integrity verification process of the target data. The child node of the integrity tree is a node in the integrity tree other than a root node.

The integrity free includes a plurality of root nodes and a plurality of child nodes. For example, the integrity tree shown in FIG. 1 includes a total of eight root nodes n30 to n37, and includes four layers of child nodes. Each node includes eight child nodes. Therefore, the layer 3 includes 64 child nodes, the layer 2 includes 512 child nodes, the layer 1 includes 4096 child nodes, and the layer 0 includes 32768 leaf nodes. It should be noted that, the integrity tree in some embodiments includes but is not limited to that shown in FIG. 1, a branching factor of the integrity tree in some embodiments includes but is not limited to 8, a quantity of layers of the integrity tree includes but is not limited to 5, and bits occupied by nodes may be the same or different.

In some embodiments, the branching factor of the integrity tree is a preset parameter, and the preset parameter is a positive integer greater than 8 in exponential multiples of 2. Assuming that the preset parameter is b, the preset parameter b meets the following formula (1):

$$b>2^n, n=4, 5, 6, 7 \ldots \quad (1)$$

where n is a positive integer greater than or equal to 4, that is, the branching factor of the integrity tree in some embodiments is a positive integer greater than 8 in exponential multiples of 2, for example, 16, 32, or 64.

A current common branching factor of the integrity tree is 8, while the branching factor of the integrity tree in some embodiments is greater than 8, for example, 16 or 32, so that a quantity of layers of the integrity tree can be reduced, and a quantity of times of accessing the integrity tree by the processor can be reduced, thereby improving a data integrity verification speed. For example, the integrity tree maintains 16 GB storage space. The current branching factor of the integrity tree is 8, and a quantity of layers of an integrity tree generated by the branching factor is $\log_8(16,000,000,000)=12$ layers. During integrity verification, the memory needs to be accessed 12 times, which results in high time overheads of integrity verification and a slow verification speed. In some embodiments, the branching factor of the integrity tree is greater than 8, for example, 32, and when the integrity tree whose branching factor is 32 maintains 16 GB storage space, a quantity of layers of the integrity tree is $\log 32(16,000,000,000)=7$. During integrity verification, the memory needs to be accessed only seven times, which effectively reduces a quantity of times of accessing the integrity tree by the processor, thereby reducing high time overheads of integrity verification, and improving an integrity verification speed.

In some embodiments, the processor may determine the branching factor of the integrity tree based on a size of the memory and/or access of the processor to the memory. For example, when storage space of the memory is relatively small, or the processor accesses the storage space of the memory unevenly, the processor selects a relatively small branching factor of the integrity tree, for example, selects 16 as the branching factor of the integrity tree. For another example, if the storage space of the memory is relatively large, and the processor accesses the storage space of the memory relatively evenly, the processor selects a relatively large branching factor of the integrity tree, for example, selects 32 or 54 as the branching factor of the integrity tree.

In some embodiments, the root nodes of the integrity tree are stored in a form of a decompressed state in the processor, to ensure security of the root nodes, and prevent an attacker from tampering with the root nodes. This may be due to data integrity verification not being able to be performed by using the integrity tree if the root nodes are tampered with. In addition, because the root nodes are stored in the form of the decompressed state in the processor, the MEE can quickly read the root nodes for integrity verification, thereby improving an integrity verification speed. Because storage space of the processor is limited, and the entire integrity tree cannot be stored, the child nodes in the integrity tree other than the root nodes are stored in the memory.

To save storage space of the memory and improve an integrity verification speed, in some embodiments, the plurality of child nodes of the integrity tree are stored in a form of the compressed state in the memory. It can be learned from the foregoing analysis that during data integrity verification, the processor reads child nodes of the integrity tree from the memory a plurality of times. In some embodiments, because the child nodes of the integrity tree are stored in the form of the compressed state in the memory, sizes of the child nodes of the integrity tree are effectively reduced, so that the processor can quickly read the child nodes in the compressed state for integrity verification, thereby reducing time overheads of integrity verification, and improving an integrity verification speed.

The following describes, by using an example, a process of compressing a child node of the integrity tree in some embodiments.

It is assumed that the branching factor of the integrity tree is 16, that is, each node includes 16 child nodes. Each node includes one overflow counter, 16 sub-counters, and one MAC. Each sub-counter occupies 40 bits, the MAC and the overflow counter each occupy 56 bits, and a size of each node is 56 bits×2+40 bits×16=752 bits. Each node has a same size, and therefore has a same compression manner. For ease of description, in some embodiments, one node, for example, a node 1, is used as an example to describe a node compression process, to which reference may be made for another node.

A data structure of the node 1 is shown in Table 1:

TABLE 1

| Size (bits) | 56 | 56 | 40 | 40 | 40 | ... | 40 |
|---|---|---|---|---|---|---|---|
| Name | MAC | Overflow counter | Sub-counter 1 | Sub-counter 2 | Sub-counter 3 | ... | Sub-counter 16 |
| Value | D1 | B1 | A1 | A2 | A3 | ... | A16 |

As shown in Table 1, one node includes one overflow counter and 16 sub-counters, the overflow counter occupies 56 bits, indicating that the overflow counter may represent an integer from 0 to $2^{56}-1$, and one sub-counter occupies 40 bits, indicating that one sub-counter may represent an integer from 0 to $2^{46}-1$. If 0 is represented by 40 bits, its actual stored value is 0000000000 0000000000 0000000000 0000000000. If 1 is represented by 40 bits, its actual stored value is 0000000000 0000000000 0000000000 0000000001. However, because values of most sub-counters are relatively small, there are a large quantity of 0s, and storage space is wasted. In addition, because a node length of 40 bits is relatively long, it is time-consuming for the processor to read a node from the memory, thereby affecting data integrity verification efficiency.

To resolve the foregoing technical problems, in some embodiments, the node 1 shown in Table 1 is compressed. A method for compressing the node 1 includes but is not limited to the following several manners:

Manner 1: The node 1 shown in Table 1 is compressed in an equal-length compression manner, that is, a length of each sub-counter in the node 1 is compressed from 40 bits to a first preset value. The first preset value is any even number less than 40 bits and greater than 0.

For example, it is assumed that the first preset value is 16 bits, a decimal value of the value A1 of the sub-counter 1 is 1, and a binary value of corresponding 40 bits is 0000000000 0000000000 0000000000 0000000001. The value A1 of the sub-counter 1 is compressed from the 40 bits to 16 bits, and a binary value of the 16 bits corresponding to A1 is 000000 0000000001. It is assumed that a decimal value of the value A2 of the sub-counter 2 is 555, and a binary value of corresponding 40 bits is 00000000000 0000000000 0000000000 0000110111. The value A2 of the sub-counter 2 is compressed from the 40 bits to 16 bits, and a binary value of the 16 bits corresponding to A2 is 000000 0000110111. By analogy, each sub-counter of the node 1 in Table 1 may be compressed from 40 bits to 16 bits, as shown in Table 2:

TABLE 2

| Size (bits) | 56 | 56 | 16 | 16 | 16 | ... | 16 |
|---|---|---|---|---|---|---|---|
| Name | MAC | Overflow counter | Sub-counter 1 | Sub-counter 2 | Sub-counter 3 | ... | Sub-counter 16 |
| Value | D1 | B1 | A1 | A2 | A3 | ... | A16 |

As shown in Table 2, a size of a compressed node 1 is 56 bits×2+16 bits×16=368 bits. Compared with the 752 bits before compression, a data amount of the node 1 is effectively reduced. When the node 1 with a smaller data amount is stored in the memory, storage space of the memory can be saved, and the processor can quickly read the node 1 in the compressed state, thereby improving a data integrity verification speed, and reducing time overheads of integrity verification.

As shown in Table 2, when the node 1 is compressed, the sub-counters of the node 1 are compressed, while the MAC and the overflow counter of the node 1 are not compressed. In this way, the MAC or the overflow counter of the node 1 can be prevented from overflowing.

In some examples, to further compress the node 1, the MAC and/or the overflow counter of the node 1 is compressed, that is, a value of the MAC and/or the overflow counter of the node 1 is compressed from 56 bits to 16 bits, as shown in Table 3:

TABLE 3

| Size (bits) | 16 | 16 | 16 | 16 | 16 | ... | 16 |
|---|---|---|---|---|---|---|---|
| Name | MAC | Overflow counter | Sub-counter 1 | Sub-counter 2 | Sub-counter 3 | ... | Sub-counter 16 |
| Value | D1 | B1 | A1 | A2 | A3 | ... | A16 |

As shown in Table 3, the MAC and the overflow counter of the node 1 are compressed from 56 bits to 16 bits, to further reduce the data amount of the node 1, so that when the processor reads the node 1 in the compressed state from the memory, a reading speed of the processor is further improved, thereby further increases the data integrity verification speed.

When reading data in the memory, the processor uses a minimum storage unit of the memory as a reading unit. Therefore, sizes of the integrity tree child nodes stored in the memory cannot be greater than that of the minimum storage unit of the memory. For example, when the memory is an internal memory, a minimum storage unit of the internal memory is a cache line. A size of one cache line is usually 512 bits or 64 bytes. That is, when a compressed second child node is stored in the internal memory, a size of the compressed second child node cannot be greater than 512 bits or 64 bytes. If the memory is a hard disk, a minimum storage unit of the hard disk is a sector or a block. One sector or block is usually 4096 bytes. That is, when a compressed second child node is stored in the hard disk, a size of the compressed second child node cannot be greater than 4096 bytes.

In some embodiments, if the node 1 cannot be compressed to the minimum storage unit of the memory, a first preset value may be added to the value B1 of the overflow counter of the node 1 to obtain B2. For example, if the first preset value is 1, B2=B1+1. In addition, the value of each sub-counter of the node 1 is set to a second value. For example, the second value is 0. In this case, a data structure of a compressed node 1 is shown in Table 4:

TABLE 4

| Size (bits) | 56 | 56 | 16 | 16 | 16 | ... | 16 |
|---|---|---|---|---|---|---|---|
| Name | MAC | Overflow counter | Sub-counter 1 | Sub-counter 2 | Sub-counter 3 | ... | Sub-counter 16 |
| Value | D2 | B2 | C | C | C | ... | C |

In Table 4, C is the second value, and D2 is a re-determined MAC value of the node 1. The MAC value D2 of the node 1 is recalculated by using a MAC function based on a value of a counter of a parent node corresponding to the node 1, and the value B2 of the overflow counter and the values C of the sub-counter 1 to the sub-counter 16 in Table 4.

It should be noted that the first preset value may be specified by a user, or may be determined by the processor. A manner in which the processor determines the first preset value includes but is not limited to the following several examples:

Example 1: The processor determines the first preset value based on the size of the minimum storage unit of the memory and the data structure of the child node in the decompressed state. For example, the memory is an internal memory. A minimum storage unit of the internal memory is a cache line, a size of the cache line is 512 bits or 64 bytes, and a size of a child node stored in the memory cannot exceed a size of one cache line. The node 1 in Table 1 is used as an example. The node 1 includes one overflow counter, 16 sub-counters, and one MAC, and the MAC and the overflow counter each occupy 56 bits. If the MAC and the overflow counter of the node 1 are not compressed, each still occupies 56 bits in one cache line. In this way, remaining 400 bits of the one cache line are allocated to the 16 sub-counters, and then it is determined that the first preset value cannot exceed 25 bits. If the MAC and the overflow counter of the node 1 are also compressed, the 512 bits are equally divided into 18 parts, and each part occupies 28 bits. Therefore, the first preset value cannot exceed 28 bits.

Example 2: The processor determines the first preset value based on values of a preset quantity of sub-counters in the child node. For example, it is assumed that the preset quantity is 80%. The node 1 shown in Table 1 is used as an example. It is assumed that values of 80% of the 16 sub-counters of the node 1 are less than a decimal number 100. The decimal number 100 may be represented by using 7 bits. Therefore, it may be determined that the first preset value is greater than or equal to 7 bits and less than 28 bits.

It should be noted that, in some embodiments, the first preset value may alternatively be determined in another manner. A specific manner of determining the first preset value is not limited in this embodiment of this application.

In Manner 1, each child node of the integrity tree is compressed to the first preset value in the equal-length compression manner, and a data amount of the child node is significantly reduced after compression. Then, each compressed child node is stored in the memory.

After reading a child node in the compressed state from the memory, the processor decompresses the child node in the compressed state. A length of the child node in the compressed state is decompressed to a length before compression. The node 1 is used as an example. The processor decompresses the node 1 in the compressed state shown in Table 2 to Table 4 into one in the decompressed state shown in Table 1. The length of each counter in the node 1 in the compressed state shown in Table 2 to Table 4 is decompressed from 16 bits to 40 bits.

In Manner 1, the child nodes of the integrity tree are compressed in the equal-length compression manner. The compression manner is simple, a compression speed is fast, and operations are convenient.

Manner 2: The node 1 shown in Table 1 is compressed in a variable-length compression manner. The sub-counters in the node 1 are compressed from 40 bits to different lengths based on the values of the sub-counters in the node 1.

It should be noted that in some embodiments, a process in which the processor compresses the node 1 in the variable-length compression manner with reference to a prefix code algorithm is described. In some embodiments, a compression algorithm such as Hoffman encoding, an LZ algorithm, or arithmetic encoding may be used, in addition to the prefix code compression algorithm.

It is assumed that in some embodiments, the counters may be respectively compressed to four different compression lengths: 16 bits, 24 bits, 32 bits, and 40 bits, and the four different compression lengths may be identified by using 2 bits. A correspondence between the four compression lengths and respective identifiers are shown in Table 5. 16 bits may represent an integer from 0 to $2^{16}-1$, and when a value of a counter is 0 to $2^{16}-1$, the counter may be compressed from 40 bits to 16 bits. 24 bits may represent an integer from 0 to $2^{24}-1$, and when a value of a counter is 0 to $2^{24}-1$, the counter may be compressed from 40 bits to 24 bits. 32 bits may represent an integer from 0 to $2^{32}-1$, and when a value of a counter is 0 to $2^{32}-1$, the counter may be compressed from 40 bits to 32 bits. 32 bits may represent an integer from 0 to $2^{32}-1$, and when a value of a counter is 0 to $2^{32}-1$, the counter may be compressed from 40 bits to 32 bits. It can be learned from above that when a value of a counter is an integer less than or equal to $2^{16}-1$, the counter may be compressed from 40 bits to 16 bits, 24 bits, or 32 bits, which is selected based on an actual requirement. For example, if a maximum compression effect is expected, the counter may be compressed from 40 bits to 16 bits. If a minimum overflow probability of the counter is expected, the counter may be compressed from 40 bits to 32 bits. This is not limited in this embodiment of this application. Similarly, when the value of the counter is an integer greater than $2^{16}-1$ and less than or equal to $2^{24}-1$, the counter may be compressed from 40 bits to 24 bits or 32 bits. When the value of the counter is an integer greater than $2^{24}-1$ and less than or equal to $2^{32}-1$, the counter may be compressed from 40 bits to 32 bits.

TABLE 5

| 2-bit identifier | Length |
|---|---|
| 00 | 16 |
| 01 | 24 |
| 10 | 32 |
| 11 | 40 |

It should be noted that, Table 5 is used as an example to show four compression lengths in some embodiments. The compression lengths in some embodiments include but are not limited to those in Table 5.

In this way, the sub-counters in the node 1 are compressed from 40 bits to different lengths by using the compression lengths shown in Table 5. For example, a decimal value of the value A1 of the sub-counter 1 is 1, and a binary value of corresponding 40 bits is 0000000000 0000000000 0000000000 0000000001. The value A1 of the sub-counter 1 is compressed from 40 bits to 16 bits, a binary value corresponding to A1 is 00 000000 0000000001, and the most significant bits 00 are used to indicate that a length of a compressed sub-counter 1 is 16 bits. It is assumed that a decimal value of the value A2 of the sub-counter 2 is 555, and a binary value of corresponding 40 bits is 00000000000 0000000000 0000000000 0000110111. The value A2 of the sub-counter 2 is compressed from 40 bits to 16 bits, a binary value corresponding to A2 is 00 000000 0000110111, and the most significant bits 00 are used to indicate that a length of a compressed sub-counter 2 is 16 bits. It is assumed that a decimal value of the value A3 of the sub-counter 3 is 333,333, and a binary value of corresponding 40 bits is 0000000000 0000000000 0101000101 1000010101. The value A3 of the sub-counter 3 is compressed from 40 bits to 32 bits, a binary value corresponding to A3 is 10 0000000000 0101000101 1000010101, and the most significant bits 10 are used to indicate that a length of a compressed sub-counter 3 is 32 bits. By analogy, the sub-counters of the node 1 shown in Table 1 may be compressed from 40 bits to different lengths, as shown in Table 6:

TABLE 6

| Size (bits) | 56 | 56 | 2 | 16 | 2 | 16 | 2 | 32 | ... | 2 | 16 |
|---|---|---|---|---|---|---|---|---|---|---|---|
| Name | MAC | Overflow counter | Length identifier 1 | Sub-counter 1 | Length identifier 2 | Sub-counter 2 | Length identifier 3 | Sub-counter 3 | ... | Length identifier 16 | Sub-counter 16 |
| Value | D1 | B1 | 00 | A1 | 00 | A2 | 10 | A3 | ... | 00 | A16 |

A size of a compressed node 1 is less than 752 bits, so that a data amount of the node 1 is effectively reduced. When the node 1 with a smaller data amount is stored in the memory, storage space of the memory can be saved, and the processor can quickly read the node 1 in the compressed state, thereby improving a data integrity verification speed, and reducing time overheads of integrity verification.

As shown in Table 6, when the node 1 is compressed, the sub-counters of the node 1 are compressed, while the MAC and the overflow counter of the node 1 are not compressed. In this way, the MAC or the overflow counter of the node 1 can be prevented from overflowing.

In some examples, to further compress the node 1, the MAC and/or the overflow counter of the node 1 is compressed, that is, a value of the MAC and/or the overflow counter of the node 1 is compressed from 56 bits to a length shown in Table 5. For example, the MAC and the overflow counter of the node 1 are compressed from 56 bits to 32 bits, as shown in Table 7:

After reading a child node in the compressed state from the memory, the processor decompresses the child node in the compressed stated. A length of the node in the compressed state is decompressed to a length before compression. For example, the lengths of the counters in the node 1 shown in Table 6 to Table 8 are decompressed to the lengths shown in Table 1.

In Manner 2, in the variable-length compression manner, an appropriate compression length is selected based on a value of a counter in a node for compression, so that compression flexibility is high.

It should be noted that in some embodiments, the child nodes of the integrity tree are stored in the memory after compressed, which not only saves storage space of the memory, but also improves a speed at which the processor reads the child nodes in the compressed state, thereby improving integrity verification efficiency.

In a data reading process, with reference to FIG. 5, the processor first queries the first cache for target data in

TABLE 7

| Size (bits) | 2 | 32 | 2 | 32 | 2 | 16 | 2 | 16 | 2 | 32 | . | 2 | 16 |
|---|---|---|---|---|---|---|---|---|---|---|---|---|---|
| Name | Length | MAC | Length | Overflow | Length | Sub-A1 | Length | Sub-A2 | Length | Sub-A3 | . | Length | Sub-A16 |
| Value | 10 | D2 | 10 | B1 | 00 | A1 | 00 | A2 | 10 | A3 | . | 00 | A16 |

As shown in Table 7, the MAC and the overflow counter of the node 1 are compressed from 56 bits to 32 bits, to further reduce the data amount of the node 1, so that when the processor reads the node 1 in the compressed state from the memory, a reading speed of the processor is further improved, thereby further increases the data integrity verification speed.

In some embodiments, if the node 1 cannot be compressed to the minimum storage unit of the memory, a first value may be added to the value of the overflow counter of the node 1, and values of other sub-counters are all set to a second value. For example, the first preset value may be added to the value B1 of the overflow counter of the node 1 to obtain B2. For example, if the first preset value is 1, B2=B1+1. In addition, the value of each sub-counter of the node 1 is set to the second value. For example, the second value is 0. In this case, a data stricture of a compressed node 1 is shown in Table 8:

response to a read request for the target data. For example, the first cache includes a plurality of levels of caches: an L1 cache, an L2 cache, and an L3 cache. The processor queries the L1 cache for the target data, queries the L2 cache for the target data if the target data is not found in the L1 cache, and queries the L3 cache for the target data if the target data is not found in the L2 cache. If the target data is still not found in the L3 cache, the processor reads the target data from the memory.

It can be learned from FIG. 5 that, to improve an integrity verification speed, the processor caches, into the second cache, a child node that is used for integrity verification last time, which may be reused. Therefore, after reading the target data from the memory, the processor may query the second cache for a first child node corresponding to the target data, to verify integrity of the target data. The processor queries the second cache for the first child node corresponding to the target data, and verifies integrity of the

TABLE 8

| Size (bits) | 2 | 32 | 2 | 32 | 2 | 16 | 2 | 16 | 2 | 32 | ... | 2 | 16 |
|---|---|---|---|---|---|---|---|---|---|---|---|---|---|
| Name | Length identifier | MAC | Length identifier | Overflow counter | Length identifier | Sub-counter 1 | Length identifier | Sub-counter 2 | Length identifier | Sub-counter 3 | ... | Length identifier | Sub-counter 16 |
| Value | 10 | D3 | 10 | C | 00 | C | 00 | C | 10 | C | ... | 00 | C |

In Table 8, C is the second value, and D3 is a re-determined MAC value of the node 1. The MAC value D3 of the node 1 is recalculated by using the MAC function based on the value of the counter of the parent node corresponding to the node 1, and the value B2 of the overflow counter and the values C of the sub-counter 1 to the sub-counter 16 in Table 8.

In Manner 2, each child node of the integrity tree is compressed in the variable-length compression manner, and a data amount of the child node is significantly reduced after compression. Then, each compressed child node is stored in the memory.

target data by using the first child node if the first child node corresponding to the target data is found in the second cache, and the entire integrity verification ends. If the first child node is not found in the processor, the processor reads the first child node in the compressed state from the memory.

S102. Decompress the first child node in the compressed state, and cache the decompressed first child node into the processor.

The first child node is used for integrity verification on the target data.

After reading the first child node in the compressed state from the memory, the processor decompresses the first child node in the compressed state. For example, the processor decompresses the first child node by using the compression algorithm shown in FIG. 5, and caches the decompressed first child node into the processor. For example, the decompressed first child node is cached in the second cache for integrity verification on the target data.

The following further describes an integrity verification process in some embodiments with reference to some examples.

It is assumed that the integrity tree in some embodiments is shown in FIG. 1, and a data structure of each node is shown in FIG. 2, and it is assumed that the target data is the data 000, and the second cache caches the leaf node v1, the node n00, and the node n20. In response to the read request for the target data, the processor first queries, in the first cache shown in FIG. 5, whether the target data (that is, the data 000) is cached. If the data 000 is not found in the first cache, the processor reads ciphertext data of the data 000 from the memory. The ciphertext data of the data 000 is encrypted data. The memory encryption engine decrypts the ciphertext data of the data 000 to obtain decrypted data 000 and a MAC corresponding to the data 000. The MAC is denoted as a stored MAC of the data 000. Because the memory is untrusted, and an attacker may tamper with the ciphertext data of the data 000 in the memory, integrity verification further needs to be performed on the read data 000.

It should be noted that the processor stores a correspondence between nodes in the integrity tree and a correspondence between leaf nodes in the integrity tree and data blocks in the memory. Alternatively, the processor obtains, from the memory, the correspondence between nodes in the integrity tree and the correspondence between leaf nodes in the integrity tree and data blocks in the memory. Therefore, when integrity verification is performed on the data 000, the processor determines, based on the correspondence between leaf nodes in the integrity tree and data blocks in the memory, the leaf node v0 corresponding to the data 000. Then, the processor queries, in the second cache, whether the leaf node v0 is cached. If the leaf node v0 is not cached in the second cache, the processor reads the leaf node v0 in the compressed state from the memory, and decompresses the leaf node v0 in the compressed state by using the compression algorithm. For example, a data structure of the leaf node v0 in the compressed state is shown in Table 2. The leaf node v0 shown in Table 2 is decompressed, a data structure of the decompressed leaf node v0 is shown in Table 1, and the decompressed leaf node v0 is cached in the second cache. Assuming that the data 000 corresponds to the sub-counter 1 in the leaf node v0, the processor calculates, by using the MAC function based on the value of the sub-counter 1 and the data 000, a MAC corresponding to the data 000. The MAC is denoted as a calculated MAC of the data 000. Matching is performed between the calculated MAC of the data 000 and the stored MAC of the data 000. If the calculated MAC of the data 000 does not match the stored MAC of the data 000, it indicates that the data 000 is tampered with, and integrity verification fails.

If the calculated MAC of the data 000 matches the stored MAC of the data 000, because the leaf node v0 is stored in the untrusted memory, integrity of the leaf node v0 further needs to be verified. The processor determines, based on the correspondence between nodes in the integrity tree, that a parent node of the leaf node v0 is the node n00. The processor finds the node n00 in the second cache, and verifies integrity of the leaf node v0 by using the node n00. The leaf node v0 corresponds to the sub-counter 1 in the node n00. The processor calculates, by using the MAC function based on the value of the sub-counter 1 of the node n00 and the value of each counter in the leaf node v0, a MAC corresponding to the leaf node v0. The MAC is denoted as a calculated MAC of the leaf node v0. Matching is performed between the calculated MAC of the leaf node v0 and a stored MAC of the leaf node v0. The stored MAC of the leaf node v0 is a MAC read by the processor from the memory. If the calculated MAC address of the leaf node v0 does not match the stored MAC address of the leaf node v0, it indicates that the leaf node v0 is tampered with, and integrity verification on the data 000 fails. If the calculated MAC address of the leaf node v0 matches the stored MAC address of the leaf node v0, it indicates that leaf node v0 is not tampered with, and integrity verification on the data 000 succeeds.

Figure 7:
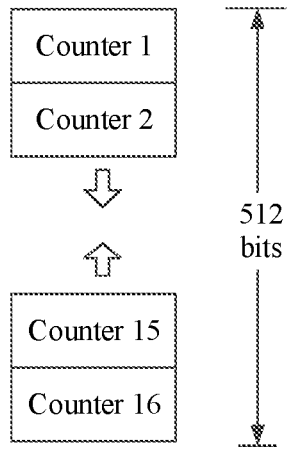
FIG. 7 is a schematic diagram of a node decompression process according to an embodiment of this application.

Optionally, to improve a decompression speed of the first child node in the compressed state, in some embodiments, at least two threads may be used to perform parallel decompression on the first child node. For example, it is assumed that the first child node is shown in Table 7, which includes 16 sub-counters and has a size of 512 bits. As shown in FIG. 7, the processor uses two threads to start decompression from two ends of the first child node, so that a decompression speed can be improved, thereby reducing time overheads caused by decompressing the first child node by the processor, and ensuring an integrity verification speed.

According to the data processing method provided in some embodiments, a processor obtains a first child node in a compressed state from a memory in response to a read request for target data when the first child node is not verified in the processor. The first child node is a child node that is in an integrity tree and that is related to the target data, the integrity tree includes a plurality of root nodes and a plurality of child nodes, the plurality of child nodes are stored in the compressed state in the memory, and the plurality of root nodes are stored in a decompressed state in the processor. Then, the processor decompresses the first child node in the compressed state, and caches the decompressed first child node into the processor for integrity verification on the target data. In some embodiments, the root nodes of the integrity tree are stored in a form of the decompressed state in the processor, which makes it convenient for the processor to perform data integrity verification by using the root nodes in the decompressed state. The child nodes of the integrity tree are stored in a form of the compressed state in the memory, so that storage space of the memory can be saved, storage space overheads of the memory can be reduced, and sizes of the child nodes can be effectively reduced, so that the processor can quickly read the child nodes in the compressed state from the memory for data integrity verification, thereby reducing time overheads of data integrity verification, and improving an integrity verification speed.

Figure 8:
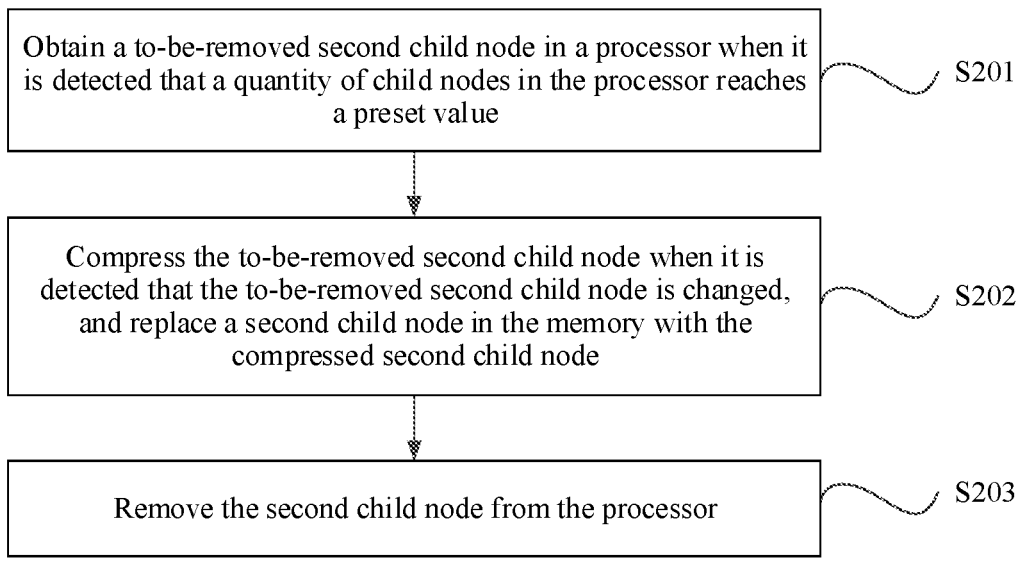
FIG. 8 is another schematic flowchart of a data processing method according to an embodiment of this application.

It can be learned from the description of the foregoing embodiments that, to improve an integrity verification speed, the processor may cache, into the processor, for example, into the second cache of the processor, a child node that is of the integrity tree and that is read from the memory last time. During integrity verification, the processor may directly read a corresponding child node from the second cache, to improve the integrity verification speed. However, storage space of the processor is limited. When a quantity of child nodes cached in the processor reaches a preset value, a cached child node needs to be removed. As shown in FIG. 8, the method in an embodiment of this application further includes the following steps.

S201. Obtain a to-be-removed second child node in the processor when it is detected that a quantity of child nodes in the processor reaches a preset value.

The preset value is a positive integer greater than or equal to 1. A specific value range of the preset value is not limited in this embodiment of this application, and is determined based on an actual situation, for example, a positive integer greater than or equal to 1, such as 3, 4, or 5.

Optionally, the preset value may be configured by a user by using a configuration file.

Optionally, the preset value may alternatively be determined by the processor based on a space size of a cache, for example, a space size of the second cache, and a size of each child node of the integrity tree in the decompressed state. For example, it is assumed that the space size of the second cache is 2500 bits, and the data structure of the child node of the integrity tree in the decompressed state is shown in Table 1, which has a size of 752 bits. Therefore, a maximum of three child nodes may be cached in the second cache, that is, the preset value does not exceed 3.

When detecting that a quantity of child nodes cached in the second cache reaches the preset value, the processor obtains a to-be-removed second child node in the second cache. A manner in which the processor obtains a to-be-removed second child node includes but is not limited to the following several manners:

Manner 1: The processor randomly selects one or more child nodes from the plurality of child nodes cached in the second cache as to-be-removed second child nodes.

Manner 2: The processor uses all the child nodes cached in the second cache as to-be-removed second child nodes.

Manner 3: The processor uses a child node with a longest cache time in the plurality of child nodes cached in the second cache as a to-be-removed second child node.

Manner 4: Each time the processor reads a child node in the second cache for integrity verification, the processor records a quantity of reading times of each child node. In this way, the processor may determine a child node having a minimum quantity of reading times in the child nodes cached in the second cache as a to-be-removed second child node.

S202. Compress the to-be-removed second child node when it is detected that the to-be-removed second child node is changed, and replace a second child node in the memory with the compressed second child node.

In some cases, a child node cached in the second cache may be changed, for example, values of one or more counters of a child node are changed, so that the child node is inconsistent with a child node stored in the memory. In this case, if the changed child node in the processor is directly removed, and the original unchanged child node in the memory is used to perform integrity verification, a problem of inaccurate integrity verification is caused.

To resolve the technical problem, in some embodiments, before removing the to-be-removed second child node, the processor needs to verify whether the to-be-removed second child node is changed. If the to-be-removed second child node is changed, the processor compresses the to-be-removed second child node, and replaces the original second child node in the memory with the compressed second child node, thereby ensuring timeliness of the integrity tree child node stored in the memory, and ensuring reliability of data integrity verification.

In an example, a manner in which the processor detects whether the second child node is changed may be as follows: The processor records an original value of each sub-counter in the second child node. The original value is a value stored in the memory. Therefore, the processor may compare a value of each sub-counter in the second child node at a current moment with the respective original value. When it is detected that a value of one or more sub-counters is changed, it indicates that the second child node is changed.

In another example, a manner in which the processor detects whether the second child node is changed may alternatively be as follows: The processor records an original MAC value of the second child node. The original MAC value is a MAC value stored in the memory. When a value of one or more counters in the second child node is changed, the MAC value of the second child node needs to be re-determined. Therefore, the processor may compare a MAC value of the second child node at a current moment with the original MAC value. When it is detected that the MAC value of the second child node at the current moment is inconsistent with the original MAC value, it indicates that the second child node is changed.

In some embodiments, a manner in which the processor compresses the to-be-removed second child node may be Manner 1 in S101, that is, the equal-length compression manner is used. For a compression process thereof, refer to the description of Manner 1. Details are not described herein again.

Optionally, a manner in which the processor compresses the to-be-removed second child node may alternatively be Manner 2 in S101, that is, the variable-length compression manner is used. With reference to a specific example, the following describes, by using the prefix code algorithm, a process in which the processor compresses the second child node in the variable-length compression manner. It should be noted that in some embodiments, a compression algorithm such as Hoffman encoding, an LZ algorithm, or arithmetic encoding may be used, in addition to the prefix code compression algorithm.

It is assumed that the branching factor of the integrity tree is 32, that is, a data structure of the second child node is shown in Table 9. The second child node includes one overflow counter, 32 sub-counters, and one MAC. Each sub-counter occupies 24 bits, the MAC and the overflow counter each occupy 56 bits, and a size of the second child node is 56 bits×2+24 bits×32=880 bits.

TABLE 9

| Size (bits) | 56 | 56 | 24 | 24 | 24 | ... | 24 |
|---|---|---|---|---|---|---|---|
| Name | MAC | Overflow counter | Sub-counter 1 | Sub-counter 2 | Sub-counter 3 | ... | Sub-counter 32 |
| Value | | 5000 | 0 | 12345678 | 1 | ... | 0 |

As shown in Table 9, the overflow counter of the second child node occupies 56 bits, indicating that the overflow counter may represent an integer from 0 to $2^{56}-1$, and one sub-counter occupies 24 bits, indicating that one sub-counter may represent an integer from 0 to $2^{24}-1$.

Example 1: It is assumed that compression lengths used in the variable-length compression manner used in some embodiments are respectively 8 bits, 16 bits, and 24 bits, and 2 bits are used to identify the different compression lengths. A correspondence between the three different compression lengths and respective identifiers is shown in Table 10:

TABLE 10

| 2-bit identifier | Length |
|---|---|
| 00 | 8 |
| 10 | 16 |
| 11 | 24 |

The sub-counters whose lengths are 24 bits in the second child node shown in Table 9 are compressed by using the three compression lengths shown in Table 10, and lengths of values of the sub-counters in Table 9 before and after compression are shown in Table 11:

TABLE 11

| Counter name | Decimal | 24-bit fixed-length binary | Variable-length binary |
|---|---|---|---|
| Sub-counter 1 | 0 | 0000 0000000000 0000000000 | 00 00000000 |
| Sub-counter 2 | 12345678 | 1011 110001100 00101001110 | 11 1011 1100011000 0101001110 |
| Sub-counter 3 | 1 | 0000 0000000000 0000000001 | |
| ... | ... | ... | ... |
| Sub-counter 32 | 0 | 0000 0000000000 0000000000 | 00 00000000 |

In Table 11, the most significant 2 bits of the variable-length binary are used to identify a length of a compressed sub-counter. For example, 00 indicate that a length of a compressed sub-counter is 8 bits, and 11 indicate that a length of a compressed sub-counter is 24 bits.

The second child node shown in Table 9 is compressed by using the three compression lengths shown in Table 10, and a data structure of an obtained compressed second child node is shown in Table 12:

TABLE 12

| Size (bits) | 56 | 56 | 2 | 8 | 2 | 24 | 2 | 8 | ... | 2 | 8 |
|---|---|---|---|---|---|---|---|---|---|---|---|
| Name | MAC | Overflow counter | Length identifier 1 | Sub-counter 1 | Length identifier 2 | Sub-counter 2 | Length identifier 3 | Sub-counter 3 | ... | Length identifier 32 | Sub-counter 32 |
| Value | | 5000 | 00 | 0 | 11 | 123456789 | 00 | 1 | ... | 00 | 0 |

In the second child node shown in Table 12, a maximum length of a sub-counter is 24 bits. Therefore, a length of the second child node in the compressed state shown in Table 12 is shorter than the length of the second child node in the decompressed state shown in Table 9, and storage space of the memory can be saved by storing, into the memory, the second child node in the compressed state shown in Table 12.

It can be learned from the description of the foregoing embodiments that, when reading data in the memory, the processor uses the minimum storage unit of the memory as a reading unit. Therefore, sizes of the integrity tree child nodes stored in the memory cannot be greater than that of the minimum storage unit of the memory.

However, in some embodiments, when the second child node cannot be compressed to the minimum storage unit of the memory, the process of compressing the to-be-removed second child node in S202 further includes step A1 and step A2.

Step A1: Pre-compress the to-be-removed second child node.

Step A2: When a size of the pre-compressed second child node in greater than the size of the minimum storage unit of the memory, the processor adds a first value to a value of an overflow counter of the second child node, sets a value of each sub-counter of the second child node to a second value, and re-compresses the reset second child node.

The first value is a positive number greater than 0, and the second value is a positive number.

As shown in Table 10, the value of the sub-counter 2 is 12345678, which has 24 bits before pre-compression and 26 bits after pre-compression. That is, after pre-compression, because 2 bits for identification are added, pre-compressed data is longer. In this way, when values of a plurality of sub-counters in the second child node are greater than or equal to 12345678, the compressed second child node is greater than the minimum storage unit of the memory, for example, greater than 512 bits.

To resolve the technical problem, in some embodiments, when detecting that the size of the pre-compressed second child node is greater than the size of the minimum storage unit of the memory, the processor adds the first value to the value of the overflow counter of the second child node, and sets the value of each sub-counter of the second child node to the second value. Assuming that the first value is 1 and the second value is 0, a reset data structure of the second child node shown in Table 9 is shown in Table 13:

TABLE 13

| Size (bits) | 56 | 56 | 24 | 24 | 24 | ... | 24 |
|---|---|---|---|---|---|---|---|
| Name | MAC | Overflow counter | Sub-counter 1 | Sub-counter 2 | Sub-counter 3 | ... | Sub-counter 32 |
| Value | | 5001 | 0 | 0 | 0 | ... | 0 |

A value of each sub-counter of the second child node shown in Table 13 is 0, and when the second child node is compressed, a compression speed of the second child node is fast.

Then, the second child node shown in Table 13 is compressed by using different compression lengths shown in Table 10. The compressed second child node is shown in Table 14:

TABLE 14

| Size (bits) | 56 | 56 | 2 | 8 | 2 | 8 | 2 | 8 | ... | 2 | 8 |
|---|---|---|---|---|---|---|---|---|---|---|---|
| Name | MAC | Overflow counter | Length identifier | Sub-counter 1 | Length identifier | Sub-counter 2 | Length identifier | Sub-counter 3 | ... | Length identifier | Sub-counter 32 |
| Value | D | 5001 | 00 | 0 | 00 | 0 | 00 | 0 | . | 00 | 0 |

It can be learned from Table 14 that when the value of each sub-counter of the second child node is set to the second value, for example, 0, the MAC corresponding to the second child node is changed. In this case, the processor re-determines the MAC of the second child node based on the value of each counter of the second child node shown in Table 14. In other words, a MAC value, for example, D of the second child node is recalculated by using the MAC function based on a value of a counter of a parent node corresponding to the second child node, and the value 5001 of the overflow counter of the second child node and the values 0 of the sub-counter 1 to the sub-counter 32 in Table 14, and the re-determined MAC of the second child node is written into the memory together with the second child node in the compressed state shown in Table 14.

Figure 9:
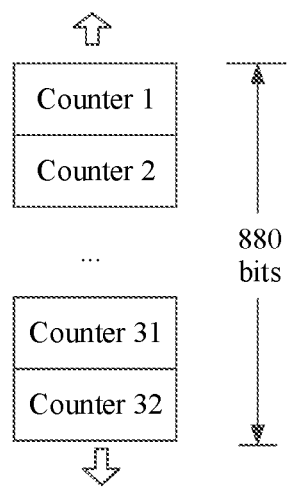
FIG. 9 is a schematic diagram of a node compression process according to an embodiment of this application.

In some embodiments, to improve a compression speed of the second child node, at least two threads may be used to compress the second child node. As shown in FIG. 9, assuming that a size of the second child node in the decompressed state is 880 bits and includes 32 sub-counters, two threads may be used to compress the second child node from two ends of the second child node, thereby improving a compression speed of the second child node.

S203: Remove the second child node from the processor.

When determining, according to the method in S202, that the second child node is changed, the processor writes the changed second child node into the memory after compressing the changed second child node, and replaces the original second child node stored in the memory. Then, the processor removes the changed second child node from the processor, to release storage space of the processor, to store a new child node read from the memory.

In some embodiments, when a quantity of integrity tree child nodes cached in the processor reaches the preset value, a to-be-removed second child node is determined from the cached child nodes, and it is detected whether the to-be-removed second child node is changed. If the to-be-removed second child node is not changed, the second child node is removed from the processor. If it is detected that the to-be-removed second child node is changed, the second child node is compressed, and a second child node in the memory is replaced with the compressed second child node, and the second child node is removed from the processor. This ensures timeliness of the integrity tree child node stored in the memory while releasing storage space of the processor, thereby ensuring reliability of data integrity detection.

Figure 10:
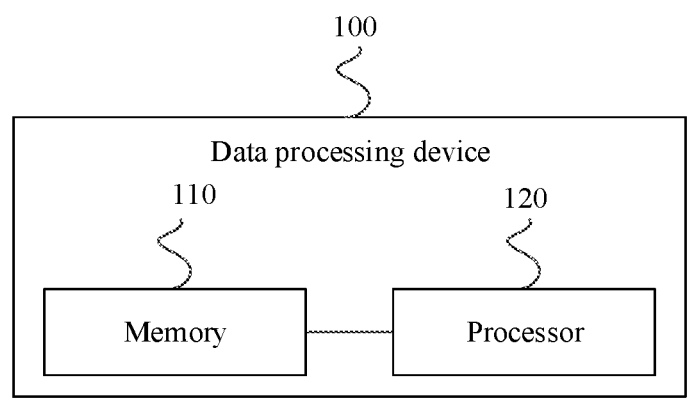
FIG. 10 is a schematic diagram of a structure of a data processing device according to an embodiment of this application.

FIG. 10 is a schematic diagram of a structure of a data processing device according to an embodiment of this application. Referring to FIG. 10, the data processing device 100 includes a processor 120 and a memory 110. The memory 110 is configured to store data. The processor 120 is configured to perform read/write access on the data stored in the memory 110.

The processor 120 is configured to: obtain a first child node in a compressed state from the memory 110 in response to a read request for target data when the first child node is not detected in the processor 120, where the first child node is a child node that is in an integrity tree and that is related to the target data, the integrity tree includes a plurality of root nodes and a plurality of child nodes, the plurality of child nodes are stored in the compressed state in the memory 110, and the plurality of root nodes are stored in a decompressed state in the processor 120; and decompress the first child node in the compressed state, and cache the decompressed first child node into the processor 120, where the first child node is used for integrity verification on the target data.

In some embodiments, the processor 120 is configured to: obtain a to-be-removed second child node in the processor 120 when it is detected that a quantity of child nodes in the processor 120 reaches a preset value; and compress the to-be-removed second child node when it is detected that the to-be-removed second child node is changed, and replace a second child node in the memory 110 with the compressed second child node.

In some embodiments, the processor 120 is configured to: pre-compress the to-be-removed second child node, and when a size of the pre-compressed second child node is greater than a size of a minimum storage unit of the memory 110, add a first value to a value of an overflow counter of the second child node, set a value of each sub-counter of the second child node to a second value, and re-compress the reset second child node. The first value is a positive number greater than 0, and the second value is a positive number.

Optionally, the first value is 1, and/or the second value is 0.

In some embodiments, the processor 120 is configured to: when the value of each sub-counter of the second child node is set to the second value, re-determine a message authentication code MAC of the second child node; and write the re-determined MAC into the memory 110.

Optionally, a branching factor of the integrity tree is a preset parameter, and the preset parameter is a positive integer greater than 8 in exponential multiples of 2. For example, the preset parameter is 16 or 32.

In some embodiments, the processor 120 is configured to: perform parallel decompression on the first child node by using at least two threads; and/or perform parallel compression on the to-be-removed second child node by using at least two threads.

The data processing device in some embodiments may be configured to perform the technical solutions of the foregoing methods. Implementation principles and technical effects thereof are similar, and details are not described herein again.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again. In addition, mutual reference may be made between the method embodiments and the apparatus embodiments, and same or corresponding content in different embodiments may be mutually referenced. Details are not described again.

What is claimed is:

1. A data processing method, comprising:
    obtaining a first child node in a compressed state from a memory in response to a read request for target data when the first child node is not detected in a processor, wherein the first child node is a child node that is in an integrity tree and that is related to the target data, wherein the integrity tree comprises a plurality of root nodes and a plurality of child nodes, wherein the plurality of child nodes are stored in the compressed state in the memory, and the plurality of root nodes are stored in a decompressed state in the processor; and
    decompressing the first child node in the compressed state, and caching the decompressed first child node into the processor, wherein the first child node is used for integrity verification on the target data;
    obtaining a to-be-removed second child node in the processor when it is detected that a quantity of child nodes in the processor reaches a preset value, wherein the to-be-removed second child node in the processor corresponds to a second child node in the memory; and
    compressing the to-be-removed second child node when it is detected that the to-be-removed second child node is changed, and replacing the second child node in the memory with the compressed to-be-removed second child node.

2. The method according to claim 1, wherein the compressing the to-be-removed second child node comprises:
    pre-compressing the to-be-removed second child node; and
    when a size of a pre-compressed second child node is greater than a size of a minimum storage unit of the memory, adding a first value to a value of an overflow counter of the second child node, setting a value of each sub-counter of the second child node to a second value, and re-compressing the reset second child node, wherein the first value is a positive number greater than 0, and the second value is a positive number.

3. The method according to claim 2, wherein the method further comprises:
    when the value of each sub-counter of the second child node is set to the second value, re-determining a message authentication code (MAC) of the second child node; and
    writing the re-determined MAC into the memory.

4. The method according to claim 1, wherein a branching factor of the integrity tree is a preset parameter, wherein the preset parameter is a positive integer greater than 8 in exponential multiples of 2.

5. The method according to claim 4, wherein the preset parameter is 16 or 32.

6. The method according to claim 1, wherein at least one of:
    the decompressing the first child node in the compressed state comprises performing parallel decompression on the first child node by using at least two threads; or
    the compressing the to-be-removed second child node comprises performing parallel compression on the second child node by using at least two threads.

7. The method according to claim 2, wherein the first value is 1 and the second value is 0.

8. A data processing device, comprising:
    a memory, configured to store data;
    a processor, configured to perform read/write access on the data stored in the memory, wherein
    the processor is further configured to:
    obtain a first child node in a compressed state from the memory in response to a read request for target data when the first child node is not detected in the processor, wherein the first child node is a child node that is in an integrity tree and that is related to the target data, wherein the integrity tree comprises a plurality of root nodes and a plurality of child nodes, wherein the plurality of child nodes are stored in the compressed state in the memory, and the plurality of root nodes are stored in a decompressed state in the processor; and
    decompress the first child node in the compressed state, and cache the decompressed first child node into the processor, wherein the first child node is used for integrity verification on the target data;
    obtain a to-be-removed second child node in the processor corresponding to a second child node in the memory when it is detected that a quantity of child nodes in the processor reaches a preset value; and compress the to-be-removed second child node when it is detected that the to-be-removed second child node is changed, and replace the second child node in the memory with the compressed to-be-removed second child node.

9. The device according to claim 8, wherein the processor is further configured to:
    pre-compress the to-be-removed second child node, and when a size of the pre-compressed second child node is greater than a size of a minimum storage unit of the memory, add a first value to a value of an overflow counter of the second child node, set a value of each sub-counter of the second child node to a second value, and re-compress the reset second child node, wherein the first value is a positive number greater than 0, and the second value is a positive number.

10. The device according to claim 9, wherein the processor is further configured to:
    when the value of each sub-counter of the second child node is set to the second value, re-determine a message authentication code (MAC) of the second child node; and write the re-determined MAC into the memory.

11. The device according to claim 8, wherein a branching factor of the integrity tree is a preset parameter, wherein the preset parameter is a positive integer greater than 8 in exponential multiples of 2.

12. The device according to claim 11, wherein the preset parameter is 16 or 32.

13. The device according to claim 8, wherein the processor is further configured to at least one of:
    perform parallel decompression on the first child node by using at least two threads; or
    perform parallel compression on the to-be-removed second child node by using at least two threads.

14. The device according to claim 9, wherein at least one of the first value is 1, or the second value is 0.

15. A non-transitory computer-readable storage medium storing instructions that, when executed by a processor of a device, cause the device to:
- obtain a first child node in a compressed state from a memory in response to a read request for target data when the first child node is not detected in a processor, wherein the first child node is a child node that is in an integrity tree and that is related to the target data, wherein the integrity tree comprises a plurality of root nodes and a plurality of child nodes, wherein the plurality of child nodes are stored in the compressed state in the memory, and the plurality of root nodes are stored in a decompressed state in the processor; and
- decompress the first child node in the compressed state, and caching the decompressed first child node into the processor, wherein the first child node is used for integrity verification on the target data; and
- obtain a to-be-removed second child node in the processor when it is detected that a quantity of child nodes in the processor reaches a preset value, wherein the to-be-removed second child node in the processor corresponds to a second child node in the memory; and
- compress the to-be-removed second child node when it is detected that the to-be-removed second child node is changed, and replacing the second child node in the memory with the compressed to-be-removed second child node.

16. The non-transitory computer-readable storage medium according to claim 15, wherein the compressing the to-be-removed second child node comprises:
- pre-compressing the to-be-removed second child node; and
- when a size of a pre-compressed second child node is greater than a size of a minimum storage unit of the memory, adding a first value to a value of an overflow counter of the second child node, setting a value of each sub-counter of the second child node to a second value, and re-compressing the reset second child node, wherein the first value is a positive number greater than 0, and the second value is a positive number.

17. The non-transitory computer-readable storage medium according to claim 15, wherein a branching factor of the integrity tree is a preset parameter, wherein the preset parameter is a positive integer greater than 8 in exponential multiples of 2.

18. The non-transitory computer-readable storage medium according to claim 17, wherein the preset parameter is 16 or 32.

19. The non-transitory computer-readable storage medium according to claim 15, wherein the decompressing the first child node in the compressed state comprises performing parallel decompression on the first child node by using at least two threads; or
- the compressing the to-be-removed second child node comprises performing parallel compression on the second child node by using at least two threads.

20. The non-transitory computer-readable storage medium according to claim 16, wherein the first value is 1 and the second value is 0.

* * * * *